United States Patent Office 3,367,926
Patented Feb. 6, 1968

3,367,926
MODIFICATION OF CRYSTALLINE STRUCTURE OF CRYSTALLIZABLE HIGH POLYMERS
John F. Voeks, Pleasant Hill, Calif., assignor to The Dow Chemical Company, Midland, Mich., a corporation of Delaware
No Drawing. Filed Mar. 25, 1964, Ser. No. 354,790
12 Claims. (Cl. 260—93.5)

This invention relates to thermoplastic high polymers, particularly hydrocarbon polymers such as α-olefin polymers, which on cooling from a molten condition are capable of crystallizing with formation of crystallites and spherulites. More particularly, it pertains to modifying the crystalline structure of such polymers by effecting the crystallization thereof by cooling from a molten condition in the presence of added nucleation agents.

It is characteristic of many crystallizable high polymers such as isotactic polypropylene that a melt of the polymer can be cooled to a temperature considerably below the melting point of its crystallized form before the molten polymer beings to crystallize. The extent of such supercooling which can be obtained depends on many factors, including the rate of cooling. The structure of the resulting crystallized product and many of its properties are dependent, inter alia, on the extent of supercooling of the melt before crystallization.

Generally, a crystallized polymer obtained by rapid cooling of a melted polymer to a relatively low crystallization temperature has a short-range crystalline order (variously called smetic, paracrystalline, or hexagonal crystalline) and contains many small, uniform spherulites; the resulting products have higher impact strength and tensile strength, lower tensile modulus and stiffness, and better clarity and transparency than products of slow cooling. Conversely, a crystallized polymer obtained by slow cooling of a melted polymer in a temperature range just below the crystalline melting point has a crystalline order (usually monoclinic) characterized by relatively high degree of crystallinity and relatively large spherulites; the resulting products have lower impact strength and tensile strength, higher tensile modulus and stiffness, and greater tendency to scatter light, making the products appear opaque.

It is apparent that the most desirable combination of properties, i.e. optimum toughness, clarity, and rigidity, is not obtainable in such products by either rapid cooling or slow cooling. In fact, molded articles made by melting, shaping, and cooling such polymer materials in usual fabrication processes have properties which are not optimum in any regard.

A better combination of physical properties in molded products of thermoplastic crystallizable high polymers can be obtained by rapidly chilling the melted plastic to produce very small spherulites and subsequently annealing the product at an elevated temperature (below the crystalline melting point) to increase the degree and perfection of crystallinity. However, such complex procedures are expensive and are limited to shapes having simple, uniform cross-sections such as foils or filaments. Where the two-step chill-anneal process is impractical or where high speed molding cycles are desired (as in injection molding) it would be desirable to carry out the crystallization rapidly and to a high degree, at a relatively high temperature, with formation of relatively small spherulites.

It is now known from U.S. Patent 2,991,264 to partially crystallize an α-olefin polymer such as polyethylene by incorporating small amounts of filler materials which are solid and insoluble in the molten polymer and which are very small in size of particles, preferably colloidal or super-colloidal (super-colloidal particles of silica are preferred), whereby the rate of crystallization of the polymer is enhanced.

It is an object of this invention to provide improvements in fabrication of thermoplastic crystallizable high polymers. A more particular object is to provide improvements in means for modifying the crystalline structure of such polymers when a quantity thereof is cooled from a molten condition to a solid condition. Another object is to provide means for effecting rapid crystallization of such polymers at a relatively high temperature, with formation of relatively small spherulites. A further object is to provide means for improving the physical and mechanical properties of plastic products of such polymers by modification of the crystalline structure of such polymers. A still more particular object is to provide such means for the fabrication of articles, from thermoplastic crystallizable high polymers, having in combination optimum properties of degree of crystallinity, stiffness, clarity, and toughness. Another object is to provide such means of fabrication of plastic articles at high speed, e.g. by molding with short molding cycle.

Other objects and advantages of the invention will be evident from the following description of the invention.

The objects of this invention are attained by modifying the crystalline structure of thermoplastic crystallizable high polymers by effecting the crystallization thereof by cooling the polymer from a molten condition to a solid condition in the presence of certain added nucleation agents as fully set forth hereinafter.

We have found that, in the conversion of a molten mass of crystallizable high polymer to a crystallized solid mass, it is the nucleation step which is the slow step and which is the most amenable to modification and control to effect improvements in the fabrication process and in the resulting product. We have further found that suitable added nucleation agents in the cooling molten polymer mass bring about formation of large numbers of sites of crystallization at relatively high temperatures (relatively less supercooling below the crystallinic melting point), whereby crystallization takes place rapidly, to a high degree and with formation of small crystallites and spherulites.

The nucleation agents for use in this invention are compounds having a sterically ordered polar structure which provides strong interaction with the polymer chain thereby inducing steric order into the mobile plastic system as the polymer melt is cooled. It is probable that the nucleators are wetted by the molten polymer.

The effect induced by the added nucleation agents is a physical, steric effect, and the nucleators are characterized as a class on the basis of physical properties as distinguished from chemical properties in the classical sense. For convenience, as shown hereinafter, examples of nucleation agents can be grouped in accordance with their chemical structure but the diversity of such structures is evidence that their function is primarily physical.

Specific illustrations of suitable nucleating agents are given below in connection with the examples.

Any thermoplastic crystallizable high polymer can be used in accordance with this invention, but its benefits are particularly advantageous in those polymers which, on rapid cooling from a melted condition, normally exhibit pronounced tendency to supercool in non-crystalline state until the temperature is substantially below their crystalline melting points and which, on slow cooling from a melted condition, tend to form large spehrulites. Among such polymers are olefin hydrocarbon crystallizable polymers, particularly stereo-regular polymers such as isotactic polypropylene, isotactic poly(3-methylbutene-1), isotactic poly(4-methylpentene-1), isotactic polystyrene, and other isotactic and syndiotactic poly(α-olefins) and derivatives thereof, crystallizable vinylidene chloride polymers (saran polymers), polyoxymethylene polymers, and crystallizable copolymers of ethylene and vinyl acetate, ethylene and ethyl acrylate, and the like.

The active nucleating agents can be incorporated in the crystallizable high polymer in effective proportionate amount from about 10 parts per million by weight based on the polymer. While there is no upper limit from the standpoint of providing or negating nucleation effect, amounts of added agent above about 20 to about 50 percent are usually used for additional, secondary benefits, for example as a filler or in preparation of master batches and the like. In ultimate compositions consisting essentially of the crystallizable polymer and the nucleator, from about 0.005 to about 1.0 percent by weight of added nucleation agent based on the crystallizable polymer is preferred, depending on other factors as indicated below. In compositions also containing added stabilizers, pigments, fillers, mold release agents, and the like, a larger proportionate amount of nucleating agent may be required to produce the desired effect.

The particle size of the added nucleating agent is not critical from the standpoint of the qualitative effect on nucleation. In general, small particle size is preferred for ease of obtaining intimate mixing and thorough distribution through the polymer. Usually, the smaller the particle size, the less nucleator is needed to provide a desired effect on crystallization, and better clarity of transparent plastic compositions is obtained with smaller particles. However, it is the ultimate particle size which is controlling, rather than the starting size of the material used, since some nucleation materials undergo further subdivision during fabrication of the plastic composition. In instances where optical properties of the product are not important, e.g. in opaque pigmented or filled articles, or where the index of refraction of the nucleator is nearly the same as that of the polymer, or where the starting particles of nucleation agent break down to small ultimate particles during fabrication, the nucleating agent particles can be relatively larger. In practice, nucleators passing an 80 mesh screen (U. S. Standard Sieve Series) (less than about 175 microns) are suitable for most applications. Particles in the order of 5 microns or smaller up to about 800 microns can be used.

The added nucleation agents are incorporated into the polymer by mixing means. Finely divided nucleator and finely divided solid polymer can be mechanically admixed, but better results are usually obtained by fluidizing the polymer, e.g. dissolving the polymer in a liquid solvent, adding the finely divided nucleator to the polymer solution, and evaporating the solvent from an intimate mixture of polymer and nucleator. The preferred procedure is to thoroughly admix the finely divided nucleating agent with the polymer in heat plastified or melted condition.

The advantages of the present invention are obtained when a composition comprising in intimate admixture a thermoplastic, crystallizable high polymer and a nucleation effective proportionate amount of a nucleation agent as described, at a temperature above the crystalline melting point of the polymer but below the decomposition temperature of the ingredients of the mixture, is cooled to a temperature below the crystalline melting point of the polymer. The absolute temperatures are not critical provided the relative temperatures are respected in consideration of the particular crystallizable polymer and nucleating agent employed, and, in turn, the nucleating agent must be selected in consideration of the temperatures necessary to put the particular crystallizable polymer in molten condition; that is, the particular nucleation agent used must be thermally stable above the crystallizable polymer melting point, and the nucleator must exist at least in part in a sterically regular configuration when the temperature of the composition is cooled below the crystalline melting point of the polymer.

It is within the ordinary skill of the art to select the optimum rate of cooling of the nucleated polymer composition from a temperature above the crystalline melting point of the polymer to temperatures below such point in consideration of the particular kind of polymer and kind and proportion of nucleating agent present in the composition and the crystalline structure desired in the product. In general, nucleated compositions in accordance with this invention crystallize at a higher temperature (less supercooling) and at higher rates (from more centers of nucleation) than do otherwise similar compositions absent the added nucleation agent. However, with slow crystallizing polymers, an ultra-fast cooling rate may mask or diminish the benefits of this invention in some instances.

For the fabrication of useful articles, the nucleated composition is made up at a temperature above the crystalline melting point of the polymer but below the decomposition point of the ingredients of the composition, as before described, or is reheated to such temperature, and, while in heat-plastified condition, is fabricated into useful or potentially useful shapes such as fibers, filaments, films, sheets, rods, tubes, or other extruded articles, or is molded by compression or injection or otherwise into molded articles and subsequently cooled to "set up" the shape and induce crystalliaztion. In a particular embodiment, a heat-plastified nucleated plastic composition as herein described is melt extruded through a long narrow slit die into a film which is carried over cooling rolls or through cooling baths of liquid or gas for controlled temperature conditioning until crystallization has occurred, then cooled to room temperature and taken to storage. In another particular embodiment, a heat-plastified nucleated plastic composition of the kind herein described is pressed by compression or injection into a mold space and cooled at a predetermined rate in the mold until the mass is "set up" and crystallized, after which the mold is opened and the molded article is ejected.

The following examples illustrate the invention but are not to be construed as limiting its scope.

In connection with the examples, numerous nucleation-active agents are employed, these agents being identified in Tables 1–9 as follows.

TABLE 1.—NUCLEATING AGENTS

*Salts of carboxylic acids containing an aromatic group*

Code        Name
1–1—Lithium benzoate
1–2—Sodium benzoate
1–3—Potassium benzoate
1–4—Rubidium benzoate
1–5—Calcium benzoate
1–6—Strontium benzoate
1–7—Barium benzoate
1–8—Nickel benzoate
1–9—Silver benzoate
1–10—Zinc benzoate
1–11—Aluminum benzoate
1–12—Bismuth benzoate
1–13—Sodium salicylate
1–14—Strontium salicylate
1–15—Sodium p-aminobenzoate
1–16—Potassium p-aminobenzoate
1–17—Sodium o-chlorobenzoate
1–18—Sodium p-chlorobenzoate
1–19—Sodium p-tolulate
1–20—Sodium p-tert-butylbenzoate
1–21—Potassium p-tert-butylbenzoate
1–22—Nickel-p-tert-butylbenzoate
1–23—Sodium phenylpyruvate
1–24—Sodium mandelate
1–25—Sodium nicotinate
1–26—Disodium phthalate
1–27—Disodium terephthalate
1–28—Potassium biphthalate TABLE 1.—NUCLEATING AGENTS—Cont.

Code    Name
1-29—Ammonium 4,4'-diphenyldicarboxylate
1-30—Sodium alpha-naphthylacetate
1-31—Aluminum p-tert-butylbenzoate
1-32—Aluminum p-isopropylbenzoate
1-33—Titanium tetrabenzoate
1-34—Cesium benzoate
1-35—Sodium p-iodobenzoate
1-36—Sodium o-methoxybenzoate
1-37—Sodium p-bromobenzoate
1-38—Potassium p-bromobenzoate
1-39—Sodium o-ethoxybenzoate
1-40—Sodium m-ethoxybenzoate
1-41—Sodium p-ethoxybenzoate
1-42—Sodium p-i-propylbenzoate
1-43—Aluminum phenylacetate
1-44—Sodium p-fluorobenzoate
1-45—Sodium p-methoxybenzoate
1-46—Sodium diphenylacetate
1-47—Sodium isonicotinate
1-48—Sodium p-hydroxybenzoate
1-49—Sodium o-bromobenzoate
1-50—Sodium 1,8-naphthalate
1-51—Sodium o-hydroxybenzoate
1-52—Sodium phenylacetate
1-53—Potassium phenylacetate
1-54—Sodium 2-terephthaloylbenzoate
1-55—Sodium o-t-butylbenzoate
1-56—Sodium 3,4-dichlorobenzoate
1-57—Sodium 2,4,5-trichlorophenoxyacetate
1-58—Potassium phenylacetate
1-59—Sodium 2,5-dihydroxybenzoate
1-60—Sodium m-chlorobenzoate
1-61—Sodium m-bromobenzoate
1-62—Aluminum p-chlorobenzoate
1-63—Cobalt benzoate
1-64—Sodium 2,2'-diphenyldicarboxylate
1-65—Sodium phenoxyacetate
1-66—Sodium α-phenoxypropionate
1-67—Cadmium benzoate
1-68—Sodium picolinate
1-69—Sodium 1,2,4,5-benzenetetracarboxylate
1-70—Sodium triphenylacetate
1-71—Ferrous benzoate
1-72—Sodium 4,4'-diphenyldicarboxylate
1-73—Sodium m-hydroxybenzoate
1-74—Sodium 1-fluorenecarboxylate
1-75—Nickelous p-t-butylbenzoate
1-76—Sodium m-methoxybenzoate
1-77—Magnesium benzoate
1-78—Sodium 2,4-dimethylbenzoate
1-79—Sodium trimesate
1-80—Manganese benzoate
1-81—Ferric benzoate
1-82—Lead benzoate
1-83—Nickelous benzoate
1-84—Aluminum dibenzoate
1-85—Cupric benzoate
1-86—Sodium 2-fluorobenzoate
1-87—Sodium 3-fluorobenzoate
1-88—Aluminum p-fluorobenzoate
1-89—Sodium o-benzoylbenzoate
1-90—Sodium benzenehexacarboxylate
1-91—Copper p-t-butylbenzoate
1-92—Sodium 2,4-dimethoxy benzoate
1-93—Sodium m-t-butylbenzoate
1-94—Aluminum p-methoxybenzoate
1-95—Aluminum p-toluate
1-96—Sodium 3,5-dimethylbenzoate
1-97—Sodium 2,5-dimethylbenzoate
1-98—Sodium cinnamate
1-99—Sodium o-toluate
1-100—Cobaltous benzoate
1-101—Aluminum p-bromobenzoate TABLE 1.—NUCLEATING AGENTS—Cont.

Code:   Name
1-102—Aluminum p-ethoxybenzoate
1-103—Sodium mesitylacetate
1-104—Sodium isophthalate
1-105—Sodium p-nitrobenzoate
1-106—Sodium o-nitrobenzoate
1-107—Aluminum mono-p-t-butylbenzoate
1-108—Sodium benzenehexacarboxylate
1-109—Sodium m-nitrobenzoate
1-110—Sodium 2-hydroxy-3,5-diiodobenzoate

TABLE 2.—NUCLEATING AGENTS

*Salts of carboxylic acids containing no aromatic group*

Code:   Name
2-1—Sodium acetate
2-2—Sodium glycolate
2-3—Potassium furoate
2-4—Manganous gluconate
2-5—Sodium glutarate
2-6—Sodium succinate
2-7—Sodium hydroxyacetate
2-8—Sodium hexanoate
2-9—Sodium suberate
2-10—Sodium 4-methylvalerate
2-11—Sodium malonate
2-12—Sodium sebacate
2-13—Sodium octanoate
2-14—Sodium valerate
2-15—Sodium undecanoate
2-16—Sodium nonanoate
2-17—Sodium tridecanoate
2-18—Sodium 1,2-cyclohexanedicarboxylate
2-19—Sodium adipate
2-20—Aluminum adipate
2-21—Sodium oxalate
2-22—Aluminum acetate
2-23—Sodium formate
2-24—Sodium 3,4-dihydro-2H-pyran-2-carboxylate
2-25—Disodium salt of ethylenedinitrilotetraacetic acid
2-26—Sodium laurate
2-27—Sodium DL-2-methyl butyrate
2-28—Sodium iodoacetate
2-29—Sodium pivalate
2-30—Sodium butyrate
2-31—Sodium pimelate
2-32—Sodium isobutyrate
2-33—Sodium isovalerate
2-34—Sodium heptanoate
2-35—Sodium azelate
2-36—Sodium 2-methylvalerate
2-37—Sodium propionate
2-38—Sodium myristate
2-39—Sodium hexahydrobenzoate.
2-40—Sodium cis-4-cyclohexane-1,2-dicarboxylate

TABLE 3.—NUCLEATING AGENTS

*Carboxylic acids and anhydrides containing an aromatic group*

Code:   Name
3-1—Benzoic acid
3-2—p-Toluic acid
3-3—p-Tert-butylbenzoic acid
3-4—p-Phenylbenzoic acid
3-5—p-Chlorobenzoic acid
3-6—3,4-dichlorobenzoic acid
3-7—p-Hydroxybenzoic acid
3-8—p-Nitrobenzoic acid
3-9—Salicylic acid
3-10—o-Acetylsalicylic acid
3-11—Mellitic acid
3-12—2-naphthoic acid
3-13—1,8-naphthalic acid
3-14—4,4'-bibenzyldicarboxylic acid

TABLE 3.—NUCLEATING AGENTS—Cont.

Code: Name
- 3–15—p,p'-Oxydibenzoic acid
- 3–16—2,4-dichlorophenoxyacetic acid
- 3–17—Mesitylacetic acid
- 3–18—Isonicotinic acid
- 3–19—Tetraphenyl-1,2-dihydrophthalic anhydride
- 3–20—9-fluorencarboxylic acid
- 3–21—Terephthalic acid
- 3–22—Isophthalic acid
- 3–23—Phthalic anhydride

TABLE 4.—NUCLEATING AGENTS
*Carboxylic acids and anhydrides containing no aromatic grouping*

Code: Name
- 4–1—Adipic acid
- 4–2—L-ascorbic acid
- 4–3—D,L-camphoric acid
- 4–4—3,6-endomethylene - 1,2,3,6 - tetrahydrophthalic acid

TABLE 5.—NUCLEATING AGENTS
*Amino acids, their salts and proteins*

Code: Name
- 5–1—Glycine
- 5–2—Sodium glycinate
- 5–3—Potassium N-phenylglycinate
- 5–4—Potassium phenylglycinate
- 5–5—D,L-alanine
- 5–6—2-methylalanine
- 5–7—D,L-α-aminoisobutyric acid
- 5–8—D,L-valine
- 5–9—D,L-leucine
- 5–10—L-isoleucine
- 5–11—D,L-2-methylleucine
- 5–12—Tyrosine
- 5–13—Crystallized bovine plasma

TABLE 6.—NUCLEATING AGENTS
*Compounds containing sulfur*

Code: Name
- 6–1—Sodium benzenesulfonate
- 6–2—Potassium benzenesulfonate
- 6–3—Sodium p-toluenesulfonate
- 6–4—Sodium 3-4-dichlorobenzene-1-sulfonate
- 6–5—Sodium diphenyl-4-sulfonate
- 6–6—Sodium m-diphenylbenzenesulfonate
- 6–7—Sodium tetrahydronaphthalenesulfonate
- 6–8—Potassium α-naphthylsulfonate
- 6–9—Sodium α-naphthylsulfonate
- 6–10—Sodium 2-anthraquinonesulfonate
- 6–11—Sodium p-diphenylaminesulfonate
- 6–12—Barium diphenylaminesulfonate
- 6–13—Sodium alizarinsulfonate
- 6–14—Aluminum p-toluenesulfonate
- 6–15—Sodium toluenesulfinate
- 6–16—Sulfanilamide
- 6–17—o-Sulfobenzoic acid imide (saccharin)
- 6–18—Sodium cyclohexylsulfamate (sodium sucaryl)
- 6–19—Potassium cyclohexylsulfamate
- 6–20—Ammonium cyclohexylsulfamate
- 6–21—Calcium cyclohexylsulfamate
- 6–22—Magnesium cyclohexylsulfamate
- 6–23—Thiourea
- 6–24—Monopotassium p-sulfobenzoate
- 6–25—Sodium p-bromobenzenesulfonate
- 6–26—Sodium p-chlorobenzenesulfonate
- 6–27—Sodium thiobenzoate
- 6–28—Sodium 2-naphthalenesulfonate
- 6–29—Sodium thiophene-2-carboxylate
- 6–30—Sodium 2,4-dimethylbenzenesulfonate
- 6–31—Sodium 2,5-dimethylbenzenesulfonate
- 6–32—Disodium m-benzenedisulfonate
- 6–33—Disodium o-mercaptobenzoate
- 6–34—Mono-sodium m-sulfobenzoate

TABLE 7.—NUCLEATING AGENTS
*Non-acidic organic compounds containing an aromatic group*

Code: Name
- 7–1—o-Terphenyl
- 7–2—m-Terphenyl
- 7–3—p-Terphenyl
- 7–4—2,3,5,6-tetramethylbenzamide
- 7–5—2,4,5-trimethylbenzamide
- 7–6—Sodium p-cyclohexylphenoxide
- 7–7—Fluorescein
- 7–8—Zinc chelate of disalicylalethylenediimine
- 7–9—Copper chelate of disalicylalethylenediimine
- 7–10—Zinc complex of N,N'-dimethyldithiooxamide
- 7–11—p-Bis(diphenylhydroxysilyl)benzene
- 7–12—Sodium phenylphosphinate
- 7–13—Hydroquinone
- 7–14—Anthraquinone
- 7–15—Poly(ethylene terephthalate)
- 7–16—Nylon resin 401
- 7–17—Phthalocyanine, metal free
- 7–18—Copper phthalocyanine
- 7–19—Phthalhydrazide
- 7–20—Sodium phenolate
- 7–21—Ferrocene

TABLE 8.—NUCLEATING AGENTS
*Non-acidic organic compounds not containing an aromatic group*

Code: Name
- 8–1—Polyoxymethylene
- 8–2—Dipentaerythritol
- 8–3—Pentaerythritol
- 8–4—Inositol

TABLE 9.—NUCLEATING AGENTS
*Inorganic compounds*

Code: Name
- 9–1—Calcium oxide
- 9–2—Magnesium oxide
- 9–3—Titanium dioxide
- 9–4—Aluminum sodium sulfate
- 9–5—Aluminum ammonium sulfate
- 9–6—Aluminum potassium sulfate The nucleating agents listed in Table 1 are salts of carboxylic acids containing an aromatic group. Both metallic and non-metallic salts are represented. Metals and metalloids from Periodic Groups I, II, III, IV, V, VII and VIII are shown. Mono- and poly-carboxylic acids are represented by carbocyclic groups (the benzene nucleus and the naphthalene nucleus) and by N-heterocyclic groups having aromatic character (the pyridine ring). Also included are salts of acids having other substituents such as halogen, hydroxyl, alkoxy, aroxy, and amino. The agents listed in Table 3 are carboxylic acids and anhydrides containing an aromatic group, also showing wide variety in kind of aromatic group, number and portion of the carboxyl group, and kind of other substituent. Together, the agents illustrated in Tables 1 and 3 are carboxylic acids containing an aromatic group and anhydrides and salts thereof.

The nucleating agents listed in Table 2 are salts of diverse carboxylic acids containing no aromatic group. Solid carboxylic acids containing no aromatic group are illustrated in Table 4.

The nucleating agents listed in Table 5 are amino acids and derivatives thereof as salts and proteins.

Together, the agents shown in Tables 1 through 5 are normally solid carboxylic acids and anhydrides and normally solid derivatives of carboxylic acids, such as salts, of many diverse kinds.

The nucleating agents listed in Table 6 are diverse compounds containing sulfur including sulfonates, sulfinate, sulfonamide, sulfo-imide, and sulfamate groups. Those listed in Tables 7 and 8 are diverse other non-acidic organic compounds. Inorganic nucleating agents are illustrated in Table 9.

For purpose of demonstrating the effect of added nucleation agents on the crystallization of crystallizable polymers in accordance with this invention, several test procedures were used as indicated in the examples that follow.

In some instances the crystallization behavior of the compositions was measured by differential thermal analysis (DTA), the principles of which were described by Bacon Ke in the Journal of Polymer Science, XLII, 15–23 (1960). In accordance with this analysis, a sample of the polymer composition is premelted under vacuum in the aluminum test block, e.g., at 200° C. in the case of polypropylene compositions, allowed to relax, e.g. for ten minutes, then subjected to a constant linear rate of cooling. The temperature differential between the test material and the reference material (in this case a chemically inert silicone fluid) is automatically plotted graphically as a function of the temperature of the reference material. As crystallization of the crystallizable polymer takes place, the plotted differential rises to a peak or maximum and then diminishes. In each test, the temperature at which the differential begins to rise is taken as the "initial" temperature of crystallization and the temperature at which the peak occurs is taken as the "peak" temperature of the crystallization. Polymer compositions containing relatively more effective nucleation agents result in relatively higher initial and peak temperatures of crystallization in the DTA test method.

In some instances the crystallization behavior of the compositions was observed and measured by depolarized light intensity technique (DLIT) in which the polymer composition comprising an added nucleation agent is melted between a microscope slide and cover glass and transferred to the hot stage of a microscope. Two different subsequent techniques are then employed. In one, a constant rate of cooling is used and the temperatures at which the intensity of the depolarized light passing through the sample begins to change and ceases changing are noted; the higher the values of such temperatures for a given base polymer the more effective is the nucleation agent in initiating crystallization. In the other technique, an isothermal procedure is used wherein the composition on the hot stage is held at a constant temperature below the crystalline melting point of the polymer and the time before first change in the intensity of the transmitted depolarized light through the sample is taken as the "induction time"; the shorter the induction time in the DLIT test, the more effective is the nucleation agent in initiating crystallization.

The effect of added nucleation agents on the physical and mechanical properties of the resulting plastic products is also shown by measuring such properties, especially tensile properties of yield strength and tensile modulus, in standard test methods.

*Example 1*

Various compositions of isotactic polypropylene as exemplary of a thermoplastic, crystallizable high polymer, and of nucleation agents identified in Tables 1 through 9, as exemplary of nucleation agents suitable for use in accordance with this invention, were prepared. Table 10 identifies the added nucleating agent by reference to Tables 1 through 9 and indicates the concentration thereof in the polymer composition. The compositions were generally prepared by stirring the additive into the molten polymer. The resulting compositions were tested by the Differential Thermal Analysis (DTA) method hereinbefore described. The initial and peak temperatures, in degrees centigrade, for the compositions are shown in Table 10. The polypropylene used was prevailingly isotactic polypropylene having melt index of 7.5 dg./min. and contained about 5 percent by weight of polymer soluble in cold xylene.

TABLE 10

[Evaluation of nucleation agents in polypropylene using differential thermal analysis]

| Test No. | Nucleating Agent Code Tables 1–9 | Concentration, Percent | Mixing Method | DTA, °C. Initial | Peak |
|---|---|---|---|---|---|
| 1 | Blank, no additive | | | 123 | 102 |
| 2 | Blank, no additive | | | 121 | 103 |
| 3 | Blank, no additive | | | 121 | 103 |
| 4 | Blank, no additive | | | 121 | 105 |
| 5 | 1-19 | 0.3 | 1 | 139 | 127 |
| 6 | 7-13 | 0.5 | 2 | 139 | 113 |
| 7 | 1-20 | 0.5 | 1 | 138 | 126 |
| 8 | 1-2 | 0.1 | 1 | 138 | 128 |
| 9 | 6-10 | 0.5 | 2 | 138 | 117 |
| 10 | 6-10 | 0.1 | 1 | 138 | 124 |
| 11 | 1-9 | 0.5 | 2 | 136 | 117 |
| 12 | 6-5 | 0.1 | 1 | 136 | 122 |
| 13 | 3-14 | 0.5 | 2 | 136 | 115 |
| 14 | 6-12 | 0.5 | 2 | 135 | 119 |
| 15 | 1-17 | 0.5 | 2 | 135 | 108 |
| 16 | 3-5 | 0.5 | 2 | 135 | 108 |
| 17 | 1-18 | 0.5 | 2 | 134 | 112 |
| 18 | 3-20 | 0.5 | 2 | 134 | 118 |
| 19 | 1-28 | 0.5 | 2 | 134 | 111 |
| 20 | 1-27 | 0.5 | 2 | 133 | 115 |
| 21 | 3-19 | 0.5 | 2 | 133 | 111 |
| 22 | 6-9 | 0.5 | 2 | 133 | 113 |
| 23 | 1-24 | 0.5 | 2 | 132 | 109 |
| 24 | 6-7 | 0.5 | 2 | 132 | 114 |
| 25 | 1-15 | 0.5 | 2 | 132 | 116 |
| 26 | 7-7 | 0.5 | 2 | 132 | 110 |
| 27 | 5-4 | 0.5 | 2 | 132 | 109 |
| 28 | 1-26 | 0.5 | 2 | 131 | 111 |
| 29 | 6-15 | 0.5 | 2 | 131 | 114 |
| 30 | 6-18 | 0.5 | 2 | 131 | 117 |
| 31 | 3-7 | 0.5 | 2 | 131 | 113 |
| 32 | 1-13 | 0.1 | 1 | 131 | 119 |
| 33 | 7-5 | 0.5 | 2 | 131 | 106 |
| 34 | 7-4 | 0.5 | 2 | 131 | 108 |
| 35 | 5-9 | 0.5 | 2 | 131 | 115 |
| 36 | 6-7 | 0.5 | 2 | 131 | 116 |
| 37 | 3-16 | 0.1 | 1 | 130 | 120 |
| 38 | 6-4 | 0.1 | 1 | 130 | 117 |
| 39 | 8-5 | 0.5 | 2 | 130 | 110 |
| 44 | 1-29 | 0.1 | 1 | 130 | 117 |
| 45 | 5-8 | 0.5 | 2 | 130 | 114 |
| 46 | 3-17 | 0.5 | 2 | 130 | 110 |
| 47 | 7-6 | 0.5 | 2 | 130 | 112 |
| 48 | 5-6 | 0.5 | 2 | 130 | 115 |
| 49 | 7-15 | 0.5 | 2 | 130 | 110 |
| 50 | 6-2 | 0.5 | 2 | 130 | 106 |
| 51 | 6-19 | 0.5 | 2 | 130 | 111 |
| 52 | 5-5 | 0.5 | 1 | 129 | 114 |
| 53 | 3-11 | 0.5 | 2 | 129 | 112 |
| 54 | 3-13 | 0.5 | 1 | 129 | 114 |
| 55 | 7-12 | 0.5 | 2 | 129 | 110 |
| 56 | 3-4 | 0.1 | 1 | 129 | 117 |
| 57 | 1-16 | 0.1 | 1 | 129 | 116 |
| 58 | 5-13 | 0.5 | 2 | 129 | 110 |
| 59 | 6-11 | 0.5 | 2 | 128 | 109 |
| 60 | 3-3 | 0.5 | 2 | 128 | 117 |
| 61 | 6-13 | 0.1 | 1 | 128 | 114 |
| 62 | 2-3 | 0.5 | 2 | 128 | 108 |
| 63 | 5-3 | 0.1 | 1 | 128 | 111 |
| 64 | 3-15 | 0.5 | 2 | 128 | 112 |
| 65 | 5-7 | 0.1 | 1 | 127 | 116 |
| 66 | 7-1 | 0.1 | 1 | 127 | 115 |
| 67 | 7-2 | 0.1 | 1 | 134 | 117 |
| 68 | 7-3 | 0.1 | 1 | 127 | 110 |
| 69 | 3-12 | 0.5 | 2 | 127 | 107 |
| 70 | 3-8 | 0.5 | 2 | 127 | 106 |
| 71 | 4-4 | 0.5 | 2 | 127 | 113 |
| 72 | 5-1 | 0.5 | 1 | 127 | 113 |
| 73 | 1-23 | 0.5 | 2 | 127 | 113 |
| 74 | 3-6 | 0.5 | 2 | 127 | 107 |
| 75 | 6-20 | 0.5 | 2 | 127 | 111 |
| 76 | 5-2 | 0.5 | 2 | 126 | 107 |
| 77 | 5-11 | 0.5 | 2 | 126 | 109 |
| 78 | 6-1 | 0.5 | 2 | 126 | 110 |
| 79 | 6-16 | 0.5 | 2 | 126 | 111 |
| 80 | 3-2 | 0.5 | 2 | 126 | 107 |
| 81 | 2-4 | 0.5 | 2 | 126 | 110 |
| 82 | 7-14 | 0.5 | 2 | 125 | 110 |
| 83 | 5-10 | 0.5 | 2 | 125 | 106 |
| 84 | 1-14 | 0.5 | 2 | 125 | 109 |
| 85 | 1-30 | 0.5 | 2 | 125 | 106 |
| 86 | 4-3 | 0.5 | 2 | 125 | 108 |
| 87 | 4-3 | 0.5 | 2 | 125 | 108 |
| 88 | 6-22 | 0.5 | 2 | 125 | 104 |
| 89 | 6-6 | 0.1 | 1 | 124 | 114 |
| 90 | 2-2 | 0.5 | 2 | 124 | 108 |
| 91 | 6-8 | 0.5 | 1 | 127 | 110 |
| 92 | 1-25 | 0.5 | 2 | 136 | |
| 93 | 7-8 | 0.5 | 2 | 135 | 121 |
| 94 | 7-10 | 0.5 | 2 | 135 | 120 |
| 95 | 7-9 | 0.5 | 2 | 131 | 117 |
| 96 | 3-18 | 0.5 | 1 | 127 | 109 |
| 97 | 7-11 | 0.5 | 1 | 126 | 113 |

Mixing Method: 1—in mixing extruder
2—stirring into molten polymer

Example 2

In manner like that of Example 1, various compositions of isotactic polypropylene and other nucleating agents identified in Tables 1-9 were prepared and tested by the DTA method. The data are shown in Table 11. The polypropylene was a different lot of the same kind used in Example 1.

TABLE 11

[Evaluation of nucleation agents in polypropylene using differential thermal analysis]

| Test No. | Nucleating Agent Code Tables 1-9 | Concentration, Percent | Mixing Method | DTA, °C. Initial | Peak |
|---|---|---|---|---|---|
| 1 | Blank, polypropylene only | | | 124 | 103.5 |
| 2 | 5-8 | 0.5 | 2 | 134 | 116 |
| 3 | 8-3 | 0.5 | 2 | 132 | 110 |
| 4 | 5-1 | 0.5 | 2 | 132 | 109 |
| 5 | 2-1 | 0.5 | 2 | 131 | 111 |
| 6 | 6-17 | 0.5 | 2 | 131 | 111 |
| 7 | 5-10 | 0.5 | 2 | 130 | 112 |
| 8 | 4-1 | 0.5 | 1 | 130 | 117 |
| 9 | 8-4 | 0.5 | 1 | 130 | 113 |
| 10 | 5-9 | 0.5 | 2 | 130 | 115 |
| 11 | 5-12 | 0.5 | 2 | 128 | 110 |
| 12 | 6-3 | 0.5 | 2 | 127 | 107 |
| 13 | 9-2 | 0.5 | 2 | 126 | 107 |
| 14 | 3-1 | 0.5 | 2 | 126 | 113 |
| 15 | 9-1 | 0.5 | 2 | 125 | 108 |
| 16 | 4-2 | 0.5 | 2 | 125 | 110 |
| 17 | 3-9 | 0.5 | 2 | 125 | 113 |
| 18 | 3-10 | 0.5 | 2 | 125 | 105 |
| 19 | 8-2 | 0.2 | 1 | 124 | 114 |

Example 3

In the same manner as in Example 1, various compositions of isotactic polypropylene and other nucleating agents identified in Tables 1-9 were prepared and tested by the DTA method. The data are shown in Table 12. In these tests the polypropylene was prevailing isotactic polypropylene having melt index of 1.0 dg./min. and contained about 6 percent by weight of polymer soluble in cold xylene.

TABLE 12

[Evaluation of nucleation agents in polypropylene using differential thermal analysis]

| Test No. | Nucleating Agent Code Table 1 | Concentration, Percent | Mixing Method | DLA, °C. Initial | Peak |
|---|---|---|---|---|---|
| 1 | Blank, no additive | | | 122 | 105 |
| 2 | 1-1 | 0.5 | 2 | 135 | 108 |
| 3 | 1-2 | 0.5 | 2 | 139 | 111 |
| 4 | 1-3 | 0.5 | 2 | 138 | 114 |
| 5 | 1-4 | 0.5 | 2 | 129 | 114 |
| 6 | 1-34 | 0.5 | 2 | 124 | 107 |
| 7 | 1-77 | 0.5 | 2 | 121 | 105 |
| 8 | 1-5 | 0.5 | 2 | 124 | 113 |
| 9 | 1-6 | 0.5 | 2 | 127 | 114 |
| 10 | 1-7 | 0.5 | 2 | 132 | 112 |
| 11 | 1-11 | 0.5 | 2 | 135 | 106 |
| 12 | 1-8 | 0.5 | 2 | 127 | 112 |
| 13 | 1-10 | 0.5 | 2 | 127 | 108 |
| 14 | 1-12 | 0.5 | 2 | 128 | 112 |
| 15 | 1-20 | 0.1 | 1 | 137 | 123 |
| 16 | 1-21 | 0.5 | 2 | 131 | 113 |
| 17 | 1-22 | 0.5 | 2 | 129 | 113 |
| 18 | 1-33 | 0.5 | 1 | 123 | 110 |
| 19 | 1-31 | 0.5 | 1 | 133 | 122 |
| 20 | 1-32 | 0.5 | 1 | 129 | 115 |

Example 4

Polypropylene compositons were made up by milling together in a Meili mill at 190° C. samples of the isotactic polypropylene described in Example 3 and 0.25 percent by weight thereof of various nucleating agents identified by reference to Tables 1-9. The resulting compositions were cooled, ground and tested by the DTA method previously described with resulting data shown in Table 13. As shown in that table, the clarity of the compositions on crystallization was observed, the scale being arbitrary from 1 being clear to 4 being opaque. Samples of the polymer otherwise identical to the nucleated compositions of Table 13 but containing no nucleating agent were opaque without exception.

TABLE 13

[Evaluation of nucleation agents in polypropylene using differential thermal analysis]

| Test No. | Nucleating Agent Code, Tables 1-9 | DTA, °C. Initial | Peak | Clarity |
|---|---|---|---|---|
| 1 | 1-2 | 143 | 132 | 1 |
| 2 | 1-2 | 143 | 132 | 1-2 |
| 3 | 1-35 | 142 | 131 | 2 |
| 4 | 1-19 | 141 | 132 | 2 |
| 5 | 1-36 | 141 | 131 | 2 |
| 6 | 1-20 | 141 | 132 | 1 |
| 7 | 1-35 | 141 | 130 | 2-3 |
| 8 | 1-37 | 141 | 130 | 2 |
| 9 | 2-39 | 140 | 130 | 2-3 |
| 10 | 1-39 | 139 | 129 | 3 |
| 11 | 1-18 | 139 | 130 | 1-2 |
| 12 | 2-18 | 139 | 128 | 2 |
| 13 | 1-41 | 139 | 128 | 1-2 |
| 14 | 2-5 | 139 | 128 | 3 |
| 15 | 1-42 | 138 | 128 | 4 |
| 16 | 1-43 | 138 | 121 | 4 |
| 17 | 1-11 | 137 | 126 | 3 |
| 18 | 1-44 | 137 | 126 | 3 |
| 19 | 1-45 | 137 | 124 | 2 |
| 20 | 1-46 | 137 | 125 | 3-4 |
| 21 | 1-17 | 137 | 124 | 3 |
| 22 | 1-21 | 137 | 127.5 | 1-2 |
| 23 | 1-47 | 137 | 120 | 4 |
| 24 | 1-48 | 137 | 122 | 3-4 |
| 25 | 1-49 | 136 | 125 | 3-4 |
| 26 | 1-50 | 136 | 126 | 3 |
| 27 | 2-6 | 136 | 125 | 3 |
| 28 | 2-7 | 136 | 123 | 4 |
| 29 | 1-7 | 136 | 122 | 2-3 |
| 30 | 1-51 | 136 | 121 | 2-3 |
| 31 | 1-52 | 136 | 120 | 4 |
| 32 | 2-40 | 136 | 122 | 1 |
| 33 | 1-3 | 135 | 124 | 4 |
| 34 | 1-54 | 135 | 120 | 4 |
| 35 | 1-55 | 135 | 122 | 3 |
| 36 | 1-1 | 134 | 125 | 3 |
| 37 | 1-56 | 134 | | 4 |
| 38 | 1-57 | 134 | 124 | 3-4 |
| 39 | 1-43 | 134 | 123 | 4 |
| 40 | 1-59 | 134 | 119 | 4 |
| 41 | 2-8 | 134 | 118 | 3 |
| 42 | 1-60 | 133 | 122 | 4 |
| 43 | 1-12 | 133 | 117 | 4 |
| 44 | 1-61 | 133 | | 4 |
| 45 | 2-9 | 133 | 120 | 4 |
| 46 | 1-62 | 132 | 121 | 3 |
| 47 | 1-7 | 132 | 120 | 3 |
| 48 | 1-5 | 132 | 115 | 4 |
| 49 | 1-63 | 132 | 120 | 3 |
| 50 | 1-56 | 132 | 116 | 4 |
| 51 | 1-64 | 132 | 118 | 4 |
| 52 | 1-5 | 131 | 117 | 4 |
| 53 | 1-65 | 131 | 118 | 3 |
| 54 | 1-4 | 131 | 117 | 3 |
| 55 | 1-34 | 131 | 117 | 3-4 |
| 56 | 1-66 | 131 | | 4 |
| 57 | 1-75 | 130 | 123.5 | 3-4 |
| 58 | 2-10 | 130 | 118.5 | 4 |
| 59 | 1-67 | 130 | 117 | 4 |
| 60 | 1-68 | 130 | 117 | 4 |
| 61 | 1-79 | 130 | 116 | 4 |
| 62 | 1-69 | 130 | 115 | 4 |
| 63 | 1-6 | 130 | 114 | 4 |
| 64 | 1-70 | 130 | 115 | 3 |
| 65 | 1-83 | 129 | 117 | 4 |
| 66 | 1-71 | 129 | 116 | 4 |
| 67 | 1-72 | 129 | 113 | 4 |
| 68 | 6-14 | 128 | 118 | 4 |
| 69 | 1-66 | 128 | 118 | 4 |
| 70 | 1-73 | 128 | 116 | 4 |
| 71 | 1-74 | 128 | 114 | 4 |
| 72 | 1-75 | 127 | 118 | 4 |
| 73 | 1-76 | 127 | 116 | 4 |
| 74 | 1-77 | 127 | 112 | 4 |
| 75 | 2-11 | 126 | 113 | 4 |
| 76 | 2-12 | 126 | 114 | 4 |
| 77 | 2-13 | 126 | 113 | 4 |
| 78 | 2-14 | 126 | 113 | 4 |
| 79 | 1-10 | 126 | 112.5 | |
| 80 | 1-25 | 126 | 112.5 | 4 |
| 81 | 6-23 | 125 | 114 | 4 |
| 82 | 1-78 | 125 | 113 | 4 |
| 83 | 2-15 | 125 | 114.5 | 4 |
| 84 | 2-16 | 124 | 110 | 4 |
| 85 | 2-17 | 124 | 110 | 4 |
| 86 | 1-86 | 141 | 136 | 2 |
| 87 | 1-87 | 141 | 132 | 2 |
| 88 | 1-84 | 139 | 134 | 3 |
| 89 | ¹ 1-84 | 138 | 133 | 2 |
| 90 | 1-88 | 137 | 133 | 2 |
| 91 | 1-89 | 136 | 132 | 2-3 |
| 92 | 2-20 | 136 | 131 | 2-1 |
| 93 | 6-25 | 136 | 131 | 3 |
| 94 | 1-90 | 136 | 129 | 4 |
| 95 | 2-20 | 135 | 131 | 2-3 |
| 96 | 1-91 | 135 | 130 | 3 |
| 97 | 1-80 | 135 | 130 | 3-4 |

TABLE 13—Continued

| Test No. | Nucleating Agent Code, Tables 1-9 | DTA, °C. Initial | DTA, °C. Peak | Clarity |
|---|---|---|---|---|
| 98 | 6-26 | 134 | 130 | 3 |
| 99 | 1-92 | 134 | 129 | 3-4 |
| 100 | 6-27 | 134 | 129 | 3-4 |
| 101 | 6-28 | 134 | 128 | 2 |
| 102 | 1-93 | 133 | 129 | 3 |
| 103 | 1-94 | 133 | 129 | 4-3 |
| 104 | 1-95 | 133 | 129 | 3 |
| 105 | 1-96 | 133 | 128 | 2-3 |
| 106 | 6-29 | 133 | 128 | 4 |
| 107 | 6-30 | 133 | 128 | 3 |
| 108 | 6-24 | 133 | 128 | 4 |
| 109 | 1-97 | 133 | 127 | 2-3 |
| 110 | 1-98 | 132 | 127 | 4 |
| 111 | 1-99 | 132 | 127 | 3 |
| 112 | 1-100 | 132 | 127 | 4 |
| 113 | 1-101 | 132 | 125 | 3 |
| 114 | 1-85 | 131 | 126 | 3 |
| 115 | 1-102 | 131 | 125 | 3-4 |
| 116 | 1-103 | 130 | 125 | 3 |
| 117 | 1-9 | 130 | 125 | 4 |
| 118 | 1-18 | 130 | 125 | 4 |
| 119 | 6-1 | 130 | 124 | 2 |
| 120 | 7-20 | 130 | 124 | 4 |
| 121 | 2-1 | 129 | 124 | 4 |
| 122 | 6-3 | 129 | 124 | 3 |
| 123 | 6-31 | 129 | 124 | 4 |
| 124 | 2-21 | 129 | 123 | 4 |
| 125 | 6-32 | 129 | 122 | 4 |
| 126 | 1-26 | 128 | 124 | 4 |
| 127 | 1-104 | 128 | 122 | 4 |
| 128 | 9-4 | 128 | 120 | 4 |
| 129 | 2-22 | 127 | 123 | 4 |
| 130 | 9-5 | 127 | 123 | 4 |
| 131 | 1-8 | 127 | 122 | 4 |
| 132 | 7-21 | 127 | 121 | 4 |
| 133 | 6-33 | 127 | 121 | 4 |
| 134 | 1-15 | 127 | 120 | 4 |
| 135 | 1-27 | 126 | 122 | 4 |
| 136 | 1-105 | 126 | 122 | 4 |
| 137 | 2-23 | 126 | 121 | 4 |
| 138 | 2-24 | 126 | 121 | 4 |
| 139 | 6-34 | 126 | 121 | 4 |
| 140 | 1-106 | 126 | 121 | 4 |
| 141 | 2-25 | 126 | 120 | 4 |
| 142 | 1-107 | 125 | 121 | 4 |
| 143 | 1-26 | 125 | 120 | 4 |
| 144 | 1-108 | 125 | 120 | 4 |
| 145 | 6-35 | 125 | 120 | 4 |
| 146 | 1-109 | 125 | 120 | 4 |
| 147 | 1-27 | 125 | 119 | 4 |
| 148 | 2-26 | 125 | 118 | 4 |
| 149 | 2-27 | 125 | 115 | 4 |
| 150 | 1-110 | 124 | 120 | 4 |
| 151 | 1-10 | 124 | 119 | 4 |
| 153 | 2-28 | 123 | 117 | 4 |
| 154 | 1-82 | 123 | 117 | 4 |
| 155 | 2-29 | 138 | 126 | 1-2 |
| 156 | 2-19 | 130 | 112 | 4 |
| 157 | 2-30 | 129 | 114 | 4 |
| 158 | 2-31 | 129 | 110 | 4 |
| 159 | 2-32 | 128 | 116 | 4 |
| 160 | 2-33 | 127 | 112 | 4 |
| 161 | 2-34 | 126 | 112 | 4 |
| 162 | 2-35 | 126 | 111 | 4 |
| 163 | 2-36 | 125 | 110 | 4 |
| 164 | 2-37 | 124 | 113 | 4 |
| 165 | 2-38 | 124 | 110 | 4 |
| 166 | 9-6 | 126 | 120 | 4 |

[1] <37 micron particle size.

Example 5

For purpose of demonstrating the benefits of the improvements of this invention on the mechanical properties of the products, various compositions of prevailingly isotactic polypropylene with various added nucleating agents were prepared, molded and tested with results shown in Table 14. The kind of polymer and kind and amount of added nucleating agent are shown in the table. The tests labeled "compression" were carried out on specimens prepared by melting and molding slabs 0.1 inch thick in a compression mold at 200° C. for 5 minutes, then chilling the slab in ice water. The tests labeled "injection" were carried out on specimens prepared by melting and injection molding 0.100 inch thick by 5 inch diameter disks in an injection mold at 25° F. above the short-shot temperature. Tensile specimens were cut from the moldings and tested in standard test methods for tensile yield strength and tensile modulus. The Table 14 also shows the DTA for these compositions.

TABLE 14

[Effect of nucleators on tensile properties of molded propylene samples]

| Test No. | Polypropylene Designation [1] | Nucleating Agent Code Tables 1-9 | Nucleating Agent Concentration, Percent | Tensile Properties Yield Strength, p.s.i. | Tensile Properties Modulus, p.s.i.×10⁻³ | Differential Thermal Analysis, °C. Initial | Differential Thermal Analysis, °C. Peak | Molding Technique |
|---|---|---|---|---|---|---|---|---|
| 1 | A | None | | 4,400 | 132 | 119 | 103 | Compression. |
| 2 | A | 1-20 | 0.1 | 4,900 | 155 | 138 | 126 | Do. |
| 3 | A | 1-19 | 0.1 | 4,700 | 141 | 139 | 127 | Do. |
| 4 | A | 1-2 | 0.1 | 5,000 | 156 | 138 | 128 | Do. |
| 5 | A | 3-4 | 0.1 | 4,700 | 147 | 129 | 117 | Do. |
| 6 | A | 6-12 | 0.1 | | 151 | 133 | 119 | Do. |
| 7 | A | 6-5 | 0.1 | 4,800 | 154 | 136 | 122 | Do. |
| 8 | A | 6-4 | 0.1 | 4,700 | 143 | 130 | 117 | Do. |
| 9 | A | 1-13 | 0.1 | 4,800 | 152 | 131 | 119 | Do. |
| 10 | A | 6-15 | 0.1 | 4,800 | 144 | 128 | 114 | Do. |
| 11 | A | 5-3 | 0.1 | 4,500 | 135 | 128 | 111 | Do. |
| 12 | A | 1-29 | 0.1 | 4,600 | 148 | 128 | 117 | Do. |
| 13 | A | 5-7 | 0.1 | 4,700 | 148 | 128 | 117 | Do. |
| 14 | A | 6-6 | 0.1 | 4,700 | 144 | 124 | 114 | Do. |
| 15 | A | 3-16 | 0.1 | 4,600 | 137 | 130 | 120 | Do. |
| 16 | B | None | | 4,000 | 132 | 122 | 105 | Injection. |
| 17 | B | 6-21 | 0.2 | 4,300 | 130 | 131 | 113 | Do. |
| 18 | B | 6-18 | 0.2 | 4,400 | 134 | 136 | 120 | Do. |
| 19 | B | 1-18 | 0.2 | 4,500 | 142 | 135 | 120 | Do. |
| 20 | B | 6-13 | 0.2 | 4,500 | 139 | 135 | 118 | Do. |
| 21 | B | Resin [2] | 0.2 | 4,300 | 128 | 133 | 120 | Do. |
| 22 | B | do [3] | 0.2 | 4,200 | 126 | 133 | 115 | Do. |
| 23 | B | do [4] | 0.2 | 4,300 | 131 | 133 | 116 | Do. |
| 24 | B | 1-28 | 0.2 | 4,300 | 131 | 132 | 113 | Do. |
| 25 | B | 7-2 | 0.2 | 4,300 | 127 | 132 | 114 | Do. |
| 26 | B | 3-20 | 0.2 | 4,300 | 129 | 133 | 115 | Do. |
| 27 | B | 2-1 | 0.2 | 4,300 | 129 | 128 | 110 | Do. |
| 28 | B | 6-10 | 0.2 | 4,500 | 138 | 134 | 119 | Do. |
| 29 | B | 1-2 | 0.2 | 4,600 | 144 | 137 | 123 | Do. |
| 30 | B | Resin [5] | 0.1 | 4,800 | 148 | | | |
| 31 | C | None | | 3,200 | 99 | | | |
| 32 | C | 1-2 | 0.1 | 3,500 | 113 | | | |
| 33 | C | 1-2 | 0.5 | 3,500 | 115 | | | |
| 34 | D | None | | 3,000 | 89 | | | |
| 35 | D | 1-2 | 0.5 | 3,400 | 107 | | | |

[1] A=Isotactic polypropylene, Melt Index 7.5, about 6% soluble in cold xylene; B=A different lot of the isotactic polypropylene described in A; C=Isotactic polypropylene containing about 10 wt. percent polyisobutylene rubber; D=Isotactic polypropylene containing about 10 wt. percent stereoregular polybutadiene rubber.
[2] A graft copolymer of acrylic acid on polypropylene.
[3] A polyoxymethylene acetal copolymer resin.
[4] A nylon resin.
[5] The sodium salt of an ethylene-acrylic acid copolymer.

Example 6

Compositions of high molecular weight prevailingly isotatic polystyrene and 0.5 percent by weight of various added nucleation agents were prepared by grinding the powdered isotatic polystyrene and powdered nucleator together in a dental mill. The resulting compositions were melted between a microscope slide and cover glass at 260° C. and transferred to the hot stage of a microscope for examination by the depolarized light intensity technique previously described. The isothermal procedure was used, holding the sample at 173° C. and measuring the induction time before initiation of crystallization. The results are shown in Table 15.

TABLE 15
[Nucleators for the crystallization of isotactic polystyrene]

| Test No. | Nucleating Agent Code, Tables 1-9 | Induction Time, Min. |
| --- | --- | --- |
| 1 | None | 100 |
| 2 | 1-80 | 60 |
| 3 | 1-81 | 59 |
| 4 | 2-18 | 46 |
| 5 | 1-35 | 41 |
| 6 | 1-44 | 39 |
| 7 | 1-43 | 38 |
| 8 | 1-10 | 30 |
| 9 | 1-21 | 27 |
| 10 | 1-41 | 26 |
| 11 | 1-19 | 24 |
| 12 | 1-26 | 20 |
| 13 | 1-67 | 20 |
| 14 | 7-19 | 18 |
| 15 | 3-21 | 16 |
| 16 | 1-37 | 15 |
| 17 | 2-19 | 14 |
| 18 | 3-22 | 14 |
| 19 | 1-63 | 13 |
| 20 | 1-82 | 13 |
| 21 | 1-9 | 10 |
| 22 | 3-23 | 10 |
| 23 | 6-24 | 9.1 |
| 24 | 1-39 | 8.6 |
| 25 | 1-83 | 8.1 |
| 26 | 1-2 | 7.5 |
| 27 | 1-17 | 7.2 |
| 28 | 1-45 | 6.6 |
| 29 | 1-84 | 4.2 |
| 30 | 1-6 | 4.0 |
| 31 | 1-46 | 3.6 |
| 32 | 1-7 | 3.5 |
| 33 | 1-12 | 3.4 |
| 34 | 1-77 | 2.7 |
| 35 | 1-85 | 2.2 |
| 36 | 1-5 | 2.1 |
| 37 | 1-71 | 1.2 |

Example 7

Test portions of a crystallizable high molecular weight copolymer of ethylene and 6 percent by weight vinyl acetate are compounded with 0.5 percent by weight of one of the following nucleating agents: sodium acetate, sodium alizarinsulfonate, hydroquinone, phthalocyanine. The resulting compositions are melted and molded in an injection mold. In each instance, the rate of crystallization is faster and the size of the spherulites is smaller than in the product of similar molding of the starting polymer absent the added nucleating agent.

In place of the particular crystallizable high polymers used in the foregoing examples there can be used another thermoplastic, crystallizable high polymer as hereinbefore described with substantially the same results.

When the compositions of thermoplastic, crystallizable high polymers and added nucleating agents in accordance with this invention are molded, the resulting molded articles have higher tensile strength, higher tensile modulus, and greater toughness in combination, fewer sink marks, less warpage, and often have better clarity than articles similarly molded from the starting polymer absent the added nucleating agent, and are capable of being produced on shorter molding time cycle.

That which is claimed is:

1. In a process for fabricating articles from a thermoplastic crystallizable high polymer which on cooling from a molten condition tends to supercool without crystallization to temperatures substantially below its crystalline melting point, the improvement which comprises modifying the crystalline structure of the polymer in such fabricated articles by compounding a composition of such thermoplastic crystallizable high polymer and a nucleation effective proportionate amount of at least about 10 parts per million by weight based on the polymer of an added nucleation agent which is chemically stable at temperatures above the crystalline melting point of the polymer and possesses a sterically ordered polar structure at temperatures below the crystalline melting point of the polymer, and which nucleation agent is selected from the compounds containing sulfur listed in Table 6 of the specification the composition being heated to a temperature above the crystalline melting point of the crystallizable polymer but below the decomposition temperature of the ingredients of the composition, shaping the composition and cooling the same to a temperature below the crystalline melting point of the crystallizable polymer, and crystallizing the crystallizable polymer, the added nucleation agent being present in the crystallizing composition as solid particles smaller than about 800 microns.

2. The improvement according to claim 1 wherein the thermoplastic crystallizable high polymer is a stereoregular polymer of an α-olefin.

3. The improvement according to claim 1 wherein the thermoplastic crystallizable high polymer is prevailingly isotactic polypropylene.

4. The improvement according to claim 1 wherein the thermoplastic crystallizable high polymer is prevailingly isotactic polystyrene.

5. An improved moldable composition of a thermoplastic crystallizable high polymer which on cooling from a molten condition tends to supercool without crystallization to temperatures substantially below its crystalline melting point compounded with a nucleation effective proportionate amount of at least about 10 parts per million by weight based on the polymer of an added nucleation agent which is chemically stable at temperatures above the crystalline melting point of the polymer and possesses a sterically ordered polar structure at temperatures below the crystalline melting point of the polymer, which composition, on being heated to a temperature above the crystalline melting point of the crystallizable polymer but below the decomposition temperature of the ingredients of the composition and cooling to a temperature below the crystalline melting point of the crystallizable polymer, contains the added nucleation agent as solid particles smaller than about 800 microns in diameter and crystallizes at a higher crystallizing temperature and at a faster crystallizing rate than the temperature and rate of such composition absent the added nucleation agent, which nucleation agent is selected from the compounds containing sulfur listed in Table 6 of the specification.

6. The improved moldable composition according to claim 5 wherein the crystallizable high polymer is a stereoregular polymer of an α-olefin.

7. The improved moldable composition according to claim 5 wherein the crystallizable high polymer is prevailingly isotactic polypropylene.

8. The improved moldable composition according to claim 5 wherein the crystallizable high polymer is prevailingly isotactic polystyrene.

9. An improved shaped article composed of a thermoplastic composition comprising a thermoplastic high polymer which on cooling from a molten condition tends to supercool without crystallizatin to temperatures substantially below its crystalline melting point, which composition is characterized by having the polymer component highly crystallized in the form of relatively small crystallites and spherulites intimately associated with uniformly dispersed finely divided solid particles smaller than about 800 microns in diameter of an added nucleation agent which is chemically stable at temperatures above the crystalline melting point of the polymer and possesses a sterically ordered polar structure at temperatures below the crystalline melting point of the polymer and is present in nucleation-effective proportionate amount of at least 10 parts per million by weight based on the polymer, which nucleation agent is selected from the compounds containing sulfur listed in Table 6 of the specification.

10. The improved shaped article according to claim 9 wherein the crystallized high polymer is a stereoregular polymer of an α-olefin.

11. The improved shaped article according to claim 9 wherein the crystallized high polymer is prevailingly isotactic polypropylene.

12. The improved shaped article according to claim 9 wherein the crystallized high polymer is prevailingly isotactic polystyrene.

References Cited
UNITED STATES PATENTS

| | | | |
|---|---|---|---|
| 3,207,736 | 9/1965 | Wijga | 260—94.9 |
| 3,207,739 | 9/1965 | Wales | 260—94.9 |

JOSEPH L. SCHOFER, *Primary Examiner.*

L. EDELMAN, *Assistant Examiner.*